US010599884B1

(12) United States Patent
Mottram

(10) Patent No.: US 10,599,884 B1
(45) Date of Patent: Mar. 24, 2020

(54) AUTO-COMPLETE FOR OPERATIONAL MESSAGE FORMS

(71) Applicant: ROCKWELL COLLINS, INC., Cedar Rapids, IA (US)

(72) Inventor: Adam Mottram, Dorking (GB)

(73) Assignee: Rockwell Collins, Inc., Cedar Rapids, IA (US)

( * ) Notice: Subject to any disclaimer, the term of this patent is extended or adjusted under 35 U.S.C. 154(b) by 408 days.

(21) Appl. No.: 15/070,859

(22) Filed: Mar. 15, 2016

(51) Int. Cl.
*G06F 17/00* (2019.01)
*G06F 40/174* (2020.01)
*G06F 3/0484* (2013.01)
*G06F 40/186* (2020.01)

(52) U.S. Cl.
CPC ........ *G06F 40/174* (2020.01); *G06F 3/04842* (2013.01); *G06F 40/186* (2020.01)

(58) Field of Classification Search
None
See application file for complete search history.

(56) References Cited

U.S. PATENT DOCUMENTS

| | | | | |
|---|---|---|---|---|
| 5,983,268 A * | 11/1999 | Freivald | ................ | G06F 16/957 709/218 |
| 7,260,773 B2 * | 8/2007 | Zernik | ................ | G06F 17/2211 707/999.202 |
| 8,886,735 B1 * | 11/2014 | Liu | ........................ | G06Q 10/107 709/206 |
| 2001/0032034 A1 * | 10/2001 | Manabe | ................... | B64F 1/368 700/225 |
| 2010/0036547 A1 * | 2/2010 | Myers | ................... | G08G 5/0013 701/3 |
| 2012/0054599 A1 * | 3/2012 | Nixon | ................. | G05B 19/4183 715/236 |
| 2013/0282739 A1 * | 10/2013 | Anderson | ............ | G06F 17/2705 707/755 |
| 2014/0032683 A1 * | 1/2014 | Maheshwari | .......... | H04L 51/063 709/206 |
| 2014/0120961 A1 * | 5/2014 | Buck | ........................ | H04W 4/12 455/466 |
| 2016/0087925 A1 * | 3/2016 | Kalavagattu | ........... | H04L 51/066 709/206 |
| 2016/0323398 A1 * | 11/2016 | Guo | ........................ | G06F 16/335 |

* cited by examiner

*Primary Examiner* — Mustafa A Amin
(74) *Attorney, Agent, or Firm* — Suiter Swantz pc llo

(57) ABSTRACT

A system and method are provided for form auto-completion. The disclosed schemes access dynamically changing data relating to particular events assets from a plurality of data sources. The data is parsed, tagged, re-formatted and inserted into data fields in one or more automated form templates. The disclosed schemes accept user input regarding a particular form to be completed with information pertaining to an identified event or asset. A format for the data to be included in a particular data field in the form is resolved and the data is presented in a form appropriate to populating the particular data field. The automated form is then dispatched to a group of known recipients that it is appropriate to inform regarding details of the event or operation of the asset.

11 Claims, 4 Drawing Sheets

200

| 210 Message Type Identifier Field |||||
|---|---|---|---|---|
| 220 Message Admin Field | Preview | Print | Save | Send —225 |

- From ▼ | 230 Sender
- To ▼ | 232 Recipients (Manually Loaded Or Pre-Addressed)
- Subject | 234 Additional Information

**240 *Flight Identifier Field***

| 241 Carrier | 243 Flt. No. | 245 Date | 247 Acft Type | 249 Other Flt. Info |

**250 *Crew Identifier Field***

| 252 Crew Position | 254 Crew Member Name | 256 Crew Member ID No. |

**260 *Destinations***

| 261 Dest. | 262 Pax No. | 263 Pax WT. | 264 Bags WT./Pos. | 265 Cargo WT./Pos./ID | 266 Fuel Gals./Pounds |
|---|---|---|---|---|---|
| | | | | | |
| | | | | | |
| | | | | | |
| | | | | | |

FIG. 2

AUTO-COMPLETE FOR OPERATIONAL MESSAGE FORMS

BACKGROUND

The inventive concepts disclosed herein relate to systems and methods for acquiring available information stored in a plurality of event-related databases to auto-complete specified event fields in standard formatted auto-fillable user forms as appropriate for particular events, improving accuracy in the information provided by reducing manual user error leading to increased efficiencies system-wide and enhanced safety in the execution of the particular events.

Air travel worldwide continues to be a preferred mode of transport for business travelers, and for those traveling for pleasure and/or convenience. Air transport has also become a principal commercial artery by which to support ever-increasing tonnage of bulk cargo transport responding to scheduled and on-demand requirements. Each individual operations, maintenance and/or support component is tasked with conducting its individual activities at an increasingly frenetic pace in order to maintain the fidelity of a fairly rigid operating schedule. All individuals involved directly in execution, or otherwise in support of the conduct, of the overall operational scheme with respect to a particular air carrier (including any airline), a particular facility (including any air terminal) or a particular support infrastructure element (including any element of, for example, the air traffic control structure) recognize that deviations from the specified schedule can quickly escalate to an unmanageable level. This is particularly true with regard to regional air transport in densely populated areas and along densely traveled air routes. The system that ensures a constant flow of passengers and freight between destinations is a system built on a fairly precise scheme of operations defined by a rigid set of rules to attempt to ensure a free flow of accurate information between all participating nodes.

A particular area of stress within the realm of air carrier operations is providing accurate information regarding those operations to myriad recipients. The free flow of information throughout the entire network is paramount to the promotion of safe and efficient operations system-wide. As technology has increased, many aviation industry operators have turned increasingly away from manually generating bills of lading to the use of automated messaging systems for accurately tracking, and more specifically recording in "written" form, all sorts of data supporting all manner of ground operations. The operational messages produced through the use of these messaging systems continue, however, to require accurate data input in relation to, for example, fuel loads and passenger loading, aircraft movements, aircraft weight and balance, baggage cargo, container and pallet loading, and passenger, baggage and cargo unloading, in order to support the safe and efficient operation of the aircraft.

In support of increasing efficiencies in the conduct of these operations, many of the involved entities have turned to the use of certain standardized "User Forms." These forms are generally provided in a standard format that includes fields that specifically address the various pieces of information required to support the specific ground operations. The presentation of the information in a standardized format promotes efficient and correct interpretation across all user groups. Even with the implementation of standardized format User Forms, however, individual users still struggle to meet deadlines during the busiest periods of high tempo and quick turnaround operations based on high task workloads and compressed time frames for task completion. Errors in accurately recording a flight readiness status, fuel calculations, weight and balance information, and/or loading and unloading of passengers, baggage and cargo can reduce margins of safety that are built into the system.

Difficulties, as they arise, may also adversely affect health and safety of individuals such as, for example, when ramp agents are then required to meet even more foreshortened deadlines generated by the necessity to undertake correction of errors based on the misinformation previously provided. Errors, therefore, in the information provided in movement messages mean that handling agents are unable to properly plan for flight arrivals causing resource issues in asset reallocation to address the generated errors, including offload delays, that will combine to increase an adverse effect on the operational performance, passenger experience, and health and safety of the involved individuals.

There are a number of technology platforms that employ automated fillable (or "auto-fill" or "auto-complete") forms. Typical of auto-complete form services are those that store static personal information such that when a particularly-identified user seeks to complete a particular form, the storage static personal information is automatically used to populate the associated fields for which the information is previously stored. These auto-complete services are, however, limited to storing and referencing static personal information.

SUMMARY

Exemplary embodiments of the systems and methods according to the inventive concepts disclosed herein may provide a scheme for implementing auto-completion of user forms to improve the effective workflow of information entry for particular event-related or asset-related information, particularly in situations in which imprecise information may cause adverse effects in the execution of the event, or operation of the asset.

Exemplary embodiments may implement unique information exchange in aviation aircraft ground handling operations that leverage proprietary information exchange services including the current proprietary AviNet® Enterprise Hub Service and services related thereto.

Exemplary embodiments may implement, for aviation ground operations, form auto-completion schemes that may employ regular expression (or RegEx) parsing of specific messages sent and received from an operational departure control system (DCS) and other possible sources of information regarding a particular flight, such as, for example, Aircraft Communications Addressing and Reporting System (ACARS) messages from the cockpits, reservations systems or other airport and/or air carrier databases.

Exemplary embodiment may accept captured data in any one of a number of different formats such as according to an International Aviation Transport Administration (IATA) specified standard, a SITATEX® usable format or a free text format to be formatted, parsed, tagged and stored in a database so that the data may then be easily retrieved to auto-complete the relevant fields on a message form.

Exemplary embodiment may employ event or asset identification schemes to search applicable databases for the required data field fillable information to complete the auto-fill forms. In embodiments, each scheduled air carrier flight may have at least a Flight Number and date with which it is associated as an identifier by which the event may be listed.

In embodiments, when messages are required to be sent, the required flight identification information may be selectable by opening a window with the required message form that, upon opening and depending on the data available, will be at least partially, if not fully, completed.

In embodiments, a user may verify the auto-fill information as presented, and may be provided a mechanism by which to edit the information provided in the message form prior to dispatching the form, in an automated manner to relevant, and often pre-loaded/pre-addressed, recipients.

Exemplary embodiments may provide for the parsing of available information from myriad data sources, appropriate re-formatting, and presentation into particular fields in a standard-format fillable form based on limited user interaction in, for example, identifying an event or asset to which certain dynamically-changing or automatically-updated information is directed.

These and other features and advantages of the disclosed systems and methods are described in, or apparent from, the following detailed description of various exemplary embodiments.

BRIEF DESCRIPTION OF THE DRAWINGS

Various exemplary embodiments of the disclosed systems and methods for acquiring available information stored in a plurality of dynamically-changing automated event-related databases to auto-complete specified event fields in standard formatted user forms as required by particular events, improving accuracy in the information provided by reducing manual user error leading to increased efficiencies system-wide and enhanced safety in the execution of the particular events, will be described, in detail, with reference to the following drawings, in which:

FIG. 2 illustrates an exemplary embodiment of an auto-fillable standard events form according to the inventive concepts disclosed herein;

DETAILED DESCRIPTION

Figure 1:
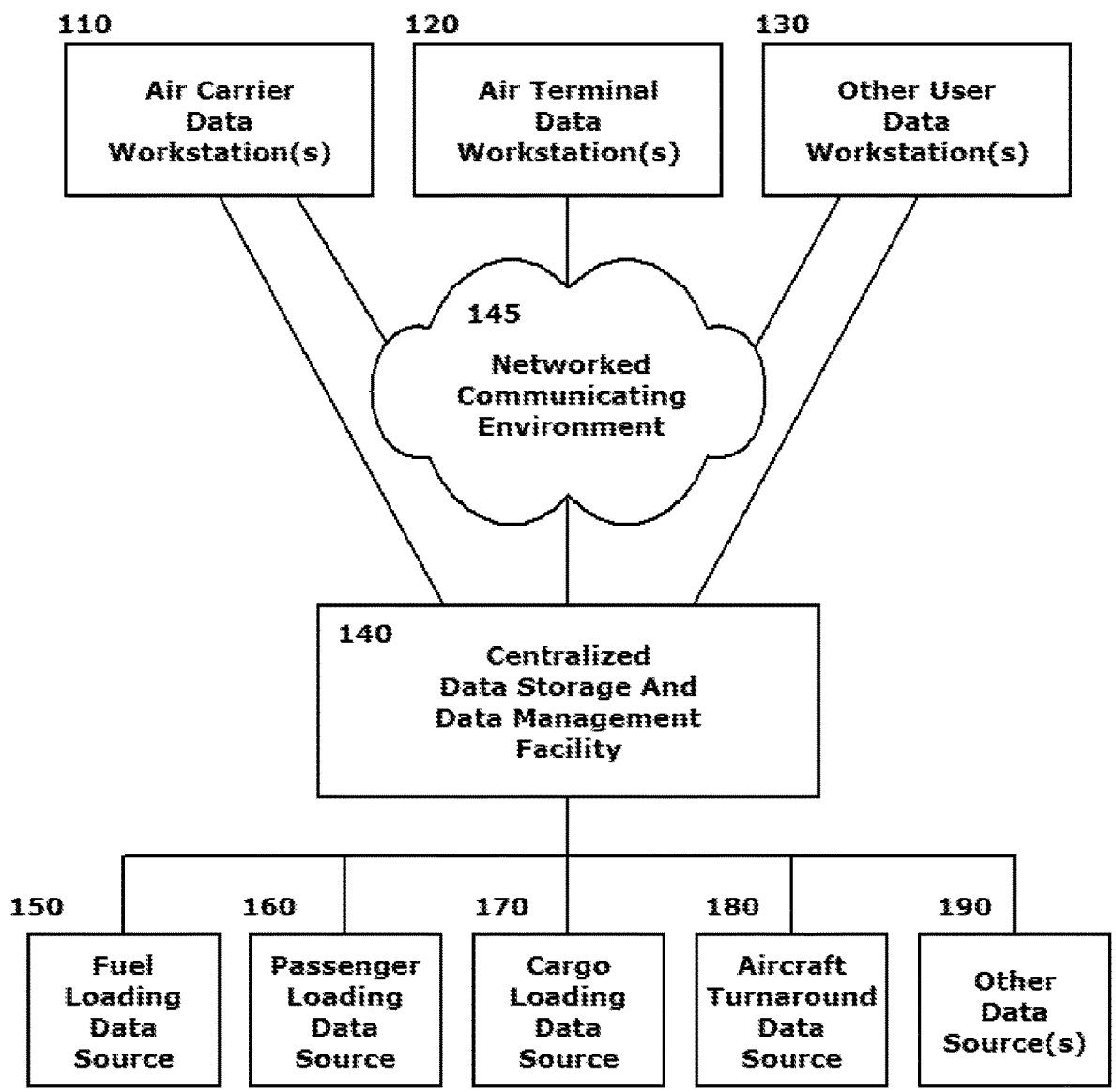
FIG. 1 illustrates an exemplary overview of an operating environment in which the auto-completion of standard events forms scheme according to the inventive concepts disclosed herein may be implemented.

The disclosed systems and methods for acquiring available information stored in a plurality of event-related databases to auto-complete specified event fields in standard formatted user forms as required by particular events, improving accuracy in the information provided by reducing manual user error leading to increased efficiencies system-wide and enhanced safety in the execution of the particular events, particularly aviation-related ground operation events, will generally refer to these specific utilities for those systems and methods. The reference to any particular use case is intended to be illustrative only, and not limiting in any way to the inventive concepts disclosed herein.

Exemplary embodiments will be described in this disclosure as being particularly adaptable to use for air carrier passenger and cargo fleet ground operations including the monitoring of proper loading, and weight and balance calculations.

The disclosed systems are connective with multiple databases in order to query those databases to acquire information automatically for completion of appropriate fields in the disclosed auto-fill forms. Many of the service providers, including the DCS and air carrier reservation systems, maintain databases which will include certain of the selected and acquirable information. This information may be retrieved, properly formatted to substantially auto-complete certain selected fields of the standard formatted events forms.

The disclosed schemes may access the available information, translate the information to a common format, and parse the information for elements that are relevant to a particular data field in one or more of the appropriate auto-fill forms. Such a system would reduce manual user error, including simple numeric data transposition errors and the like, leading to system-wide inefficiencies. An overall efficiency in operations, and reduction in error rates may be enhanced by implementing the disclosed schemes. As an example, there are standard formatted messages that are routinely sent when an aircraft is dispatched. These messages include specific information regarding the dispatch evolution for a particular aircraft tail number or flight evolution, generally involving a status of the aircraft turn-around, passenger/cargo/baggage/fuel loading information, and resultant weight and balance calculations for the aircraft.

In an embodiment, an operator may select a particular aircraft tail number and the informational forms associated with the current evolution undertaken by that aircraft may be automatically recovered with as much information as is automatically available in one or more accessible databases included in a substantially completed form format for the automated standard events forms. The user would then need to only complete a very few selected data fields, if any, in the form before forwarding the standard events form to record and track the aircraft dispatch evolution.

Features and advantages of the disclosed embodiments will be set forth in the description that follows, and in part will be obvious from the description, or may be learned by practice of the disclosed embodiments. The features and advantages of the disclosed embodiments may be realized and obtained by means of the instruments and combinations of features particularly pointed out in the appended claims.

Various embodiments of the disclosed systems and methods are discussed in detail below. While specific implementations are discussed, it should be understood that this is done for illustration purposes only. A person skilled in the relevant art will recognize that other components and configurations may be used without departing from the broad scope of the disclosed embodiments.

The disclosed schemes may leverage data available from individual proprietary and open-source data management systems and sources, including DCS, ACARS and airline proprietary data management systems. The disclosed schemes preload a series of auto-complete forms in a standardized, accepted and easily recognizable format. The disclosed schemes will provide access to the various databases in which aircraft ground operations, or other specific event-related or asset-related information may be stored in order to auto-fill the standard events forms with the latest, most up-to-date database available information which will generally be entered in a format that is particularly employed by each of the myriad different data-providing entities associated with the event.

A distinction between the inventive concepts disclosed herein and any known automated form auto-complete function includes an ability to timely acquire dynamically changing information from area database sources in order that the "correct" information is provided to populate the selected data fields in the standard events forms. This capacity of the disclosed implementations to reach substantially all database sources of operations- and maintenance-related information in real time, or substantially real time, and to accept that information in whatever form it is presented differentiates the disclosed schemes over currently-available auto-fill automated form applications. A capacity may be provided for air carriers, air terminals and other user entities to routinely update data associated with a particular aircraft movement evolution, or aircraft tail number, and to count on that information being properly parsed, tagged, stored, retrieved, formatted, and employed in the auto fill function. Users may be provided an operational flexibility and the level of assurance as to the fidelity of the information presented in the finalized forms even when individuals associated with those evolutions are under particular stress in the face of increasingly high tempo operations. Data may be changed, in an automated manner, even as a particular event evolves.

FIG. 1 illustrates an exemplary overview of an operating environment 100 in which the auto-completion of standard events forms scheme according to the inventive concepts disclosed herein may be implemented. The exemplary operating environment 100 may encompass many varied lines of communication between a number of components, data sources and communicating nodes.

A centralized data storage and data management facility 140 may communicate with a number of individual data workstations 110,120,130 for formulating and exchanging data there between including via formatted or user form messaging. The data workstations 110,120,130 may be controlled and/or operated by differing entities including air carriers, air terminal control entities, and other users as entities that have a stake in the safe and efficient conduct of the flow of air traffic in a particular region, or across an entire operating network. Communications between the data workstation(s) 110,120,130 and the centralized facility 140 may be direct wired or wireless communications, or may be via a networked communicating environment 145 to which some or all of the communicating nodes are connected.

Separately, either directly, or through a same or different networked communicating environment 145, the centralized facility 140 may gain access to myriad data sources. A non-exhaustive list of data sources may include a fuel loading data source 150, a passenger loading data source 160, a cargo loading data source 170, and aircraft turnaround data source 180, and select other data source(s) 190. From these data sources 150-190, particular data pertaining to ground operations of particular aircraft may be collected and stored in one or more databases locally at the data source, or in or associated with the centralized facility 140.

The centralized facility 140 may act as a type of clearinghouse by which all of the data that may be appropriate to support a standard events form auto-fill function may be accessed, collected, parsed, tagged, translated and/or formatted from the available data sources 150-190, so that properly formatted data for completing one or more fillable data fields in a standard events form may be provided. In embodiments, virtually all of the computing overhead for undertaking the above specific data management functions regarding data accessible from a plurality of data sources 150-190 may be undertaken at the centralized facility 140 in order that specific control of the data may be provided, on request, to populate particular data fields in a user-selected form with data regarding a particular flight (as a specified event) or a particular aircraft tail number (as a specified asset).

The centralized facility 140 has the capacity to track and extract specific data from the multiple data sources to streamline the auto-fill function for the standardized forms associated with ground operations of particular aircraft. Each ground operation with respect to a particular flight or aircraft has associated with it either a scheduled or unscheduled flight number. Each air carrier has certain flight numbers that it uses in a particular sequence to operate on set days. The individual flight numbers are reusable daily, weekly or according to other specified time frames. Each flight requires a set number of messages to be sent in relation to the flight according to a particular air carrier's operation plan or an operation plan set by a controlling agency or entity. The inventive concepts disclosed herein are intended to streamline that process by applying an overarching automated network for collecting the information and properly recording that information in messages that are presented as a series of standardized forms.

When a user, for example, at one of the workstations 110,120,130 selects a particular standard events form and a saved flight number, a request may be generated and forwarded immediately to the centralized facility 140. A server component in the centralized facility 140 may undertake retrieval of the latest data associated with that flight number from each of the individual data sources 150-190 in real time, or the centralized facility 140 may search available databases including a database stored in a local server. That acquired data may be dynamically presented on, for example, a web interface to populate relevant data fields in a pre-formatted automated form. The form may also be automatically populated with intended recipient addresses. In order to reduce errors and reduce the time for data input, the use of the disclosed auto-completion steam of the "User Forms" may be effectively employed.

The disclosed auto-completion scheme may employ detailed RegEx parsing of specific messages sent and received from operational sources including, but not limited to, an operational DCS system, or any other source of availability of data regarding any of the general categories shown as data sources 150-190 in FIG. 1. The disclosed schemes may allow the user to send a message or messages simply by selecting a flight number, opening a window with the required message form or forms which will generally appear already either fully or at least partially completed. It is anticipated that the user will generally be provided an option to edit the message form, including the information presented in any one of the data fields and the list of relevant recipients. The user may then have the option to direct that the automated message form be dispatched to the identified recipients.

For record-keeping purposes, and to ensure relevant data is available for later analysis, including event reconstruction, all messages sent and received in relation to a particular event or asset, including operation of a particular air carrier and its flights, may have copies routed to a data storage component associated with centralized facility 140 for proper archiving. For ease of review, each message may be stored in a relational database according to one or more of the following attributes: a Destination Address; a Message Originator; a Date and Time Stamp; a Standard Message Identifier; a Flight Number; and/or elements in a Body of the Message. In embodiments, the Body of the Message attribute may be further broken down to capture specific information depending on the message type. The attributes may then be retrieved generally in real time, or at a later date, to support any beneficial purpose for use and/or review of the data provided in message form.

FIG. 2 illustrates an exemplary embodiment of an auto-fillable standard events form 200 according to the inventive concepts disclosed herein. The exemplary standard events form 200 may be divided into a number of individual data fields (some of which may be permanent as being standard to the formatting of the form itself, and some of which may present fillable data fields).

A message type identifier field 210 may be provided that may be in a form of a permanent header for a particular form. When any standard events form 200 is selected, for example, from a drop-down menu of available standard events forms, the individual standard events form 200 may be presented with a title of the form in the message type identifier field 210.

Standard to automated forms, the exemplary standard events form 200 may include a message administration (or admin) field 220. This message admin field 220 may be usable to, for example, execute individual functions regarding the exemplary standard events form 200 as may be selectable from one or more "soft button" or "icon" presentations 225. In the example shown in FIG. 2, a user may select any one or more of the "soft button" or "icon" presentations 225 to execute the functions of previewing, printing, saving, or sending the exemplary standard events form 200.

The exemplary standard events form 200 may include a "From" field 230 in which a particular sender may input identifying information. Often in the field of automated forms, the sender information is automatically included in the "From" field 230 according to user information of the user who initiates a request for the exemplary standard events form 200. The exemplary standard events form 200 may include a "To" field 232 in which recipients may be manually loaded, or the exemplary standard events form 200 may be pre-addressed according to particular rules for the particular form identified in the message type identifier field 210, and is selected by the user. A "Subject" line 234 may or may not be provided in order that additional information regarding a subject to which the exemplary standard events form 200 is directed may be recorded. In embodiments, with an intent of reducing ancillary information, it may be appropriate to omit the "Subject" line 234 as the message type identifier field 210 and the other information provided in fields below may be enough to fully identify the subject to which the exemplary standard events form 200 is directed.

The exemplary standard events form 200 may include a number of fillable fields that may be populated with data that is acquired from multiple data sources in the manner discussed above with regard to the depiction in FIG. 1. It is anticipated that the user may direct the inquiry into the data source information by identifying particular flight information in a flight identifier field 240. The flight identifier field 240 may include one or more fillable fields for inputting a name of the air carrier in the fillable carrier field 241, a particularly-selected flight number in a fillable flight number field 243, and a date in a fillable date field 245. Again here, this information may be selectable from a drop-down menu. Once the particular flight on the particular date is identified, an aircraft type may be automatically populated in the fillable aircraft type field 247 and other flight information may be provided in a fillable other flight ID field 249.

The exemplary standard events form 200 may include fillable fields for identifying the crew in a crew identifier field 250. The fillable fields may include a fillable crew position field 252, a fillable crew member name field 254 and a fillable crew member ID field 256. In this manner, an aircrew may be added to the exemplary standard events form 200 and may be viewable in a drop-down menu manner once entered.

The exemplary standard events form 200 may include fillable fields for a particular flight broken up by destinations in a destinations 260 (or other titled) portion of the standard events form 200. One or more destinations may be identified in a fillable set of vertically-arranged destination fields 261 in a table format. Associated with each one of the destinations, separate fields may be provided in which, reading across, a number of passengers may be provided in a fillable set of passenger number fields 262. A total estimated passenger weight may be provided in a fillable set of passenger weight fields 263. A total actual or estimated baggage weight may be provided in a fillable set of baggage weight/position fields 264. It is generally considered important to not only identify a baggage weight, but to particularly identify a position within the aircraft at which the particular weight of baggage is placed. This can be important for weight and balance calculations for the aircraft, but can also be important to ensure that baggage associated with a particular destination is identified with respect to its position in the aircraft in order that, when that destination is reached, particular baggage can be accessed and removed from the aircraft. A total actual cargo weight, position and identification of the cargo may be provided in a fillable set of cargo weight/position/identification fields 265. In this regard, as with baggage, it can be important for weight and balance calculations for the aircraft, and also important to ensure that particular cargo associated with a particular destination is correctly positioned and identified in order that, when that destination is reached, the particular cargo can be accessed and removed from the aircraft in a fairly straightforward manner, without error, or any need to reconfigure cargo positioning within the aircraft for upcoming legs to additional destinations. A total fuel on board may be provided in a fillable set of fuel gallons/weight fields 266. Efficient use of fuel resources requires updated an ongoing "knowledge" regarding total fuel on board, as well as where in the aircraft, i.e., in which tanks, the fuel is located.

The depiction in FIG. 2 is intended to be exemplary, and not limiting, to the potential broad array of configurations for the exemplary standard events form 200, and for the information that may be listed in any one or more of the fillable fields.

Figure 3:
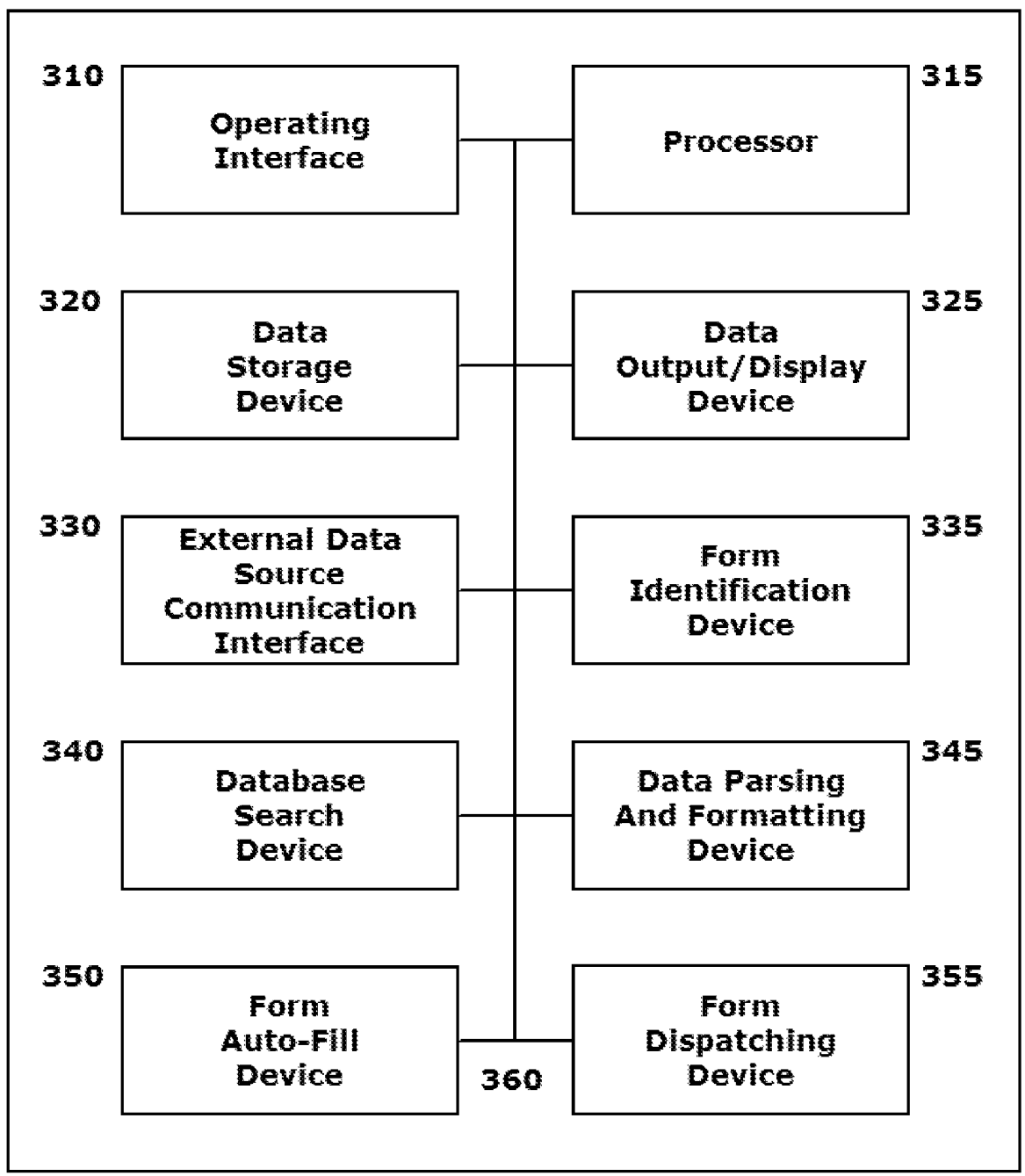
FIG. 3 illustrates an exemplary system for implementing a scheme for auto-completion of standard events forms according to the inventive concepts disclosed herein.

FIG. 3 illustrates an exemplary system 300 for implementing a scheme for auto-completion of standard events forms according to the inventive concepts disclosed herein.

The exemplary system 300 includes an operating interface 310 by which a user may communicate with the exemplary system 300 for directing operations of the exemplary system 300 in implementing the disclosed scheme for auto-completion of standard events forms. The user interface 310 may be usable in selecting one or more fillable forms and providing the minimal event information by which to initiate the auto-completion of the selected standard events forms. The user interface 310 may be further usable in initiating and directing communication with the variety of data sources with which the exemplary system 300 may be in communication to collect the data from those data sources appropriate to inclusion in individual data fields in the standard event form. The operating interface 310 may be a part or a function of a graphical user interface (GUI) mounted on, integral to, or associated with, the exemplary system 300. The operating interface 310 may alternatively take the form of any commonly user-interactive device by which user inputs and/or commands are input to an automated processing system including, but not limited to, a keyboard or a touchscreen, a mouse or other pointing device, a microphone for providing verbal commands, or any other commonly-known operating interface device.

The exemplary system 300 may include one or more local processors 315 for carrying out the individual operations and functions of the exemplary system 300. The processor(s) 315 may reference, for example, each data source and parse data associated with a particular event or asset from that data source to identify and tag information that may be responsive to one or more of the data fields in the fillable standard events form. The processor 315 may direct storing of the tagged messaging information in one or more databases for reference. The processor 315 may initiate requisite queries of the respective databases to provide real-time information to enter one or more of the data entries in the auto-fill standard events form.

The exemplary system 300 may include one or more data storage devices 320. Such data storage device(s) 320 may be used to store data or operating programs to be used by the exemplary system 300, and specifically the processor(s) 315 in carrying into effect the disclosed schemes for auto-completion of standard events forms. Data storage device(s) 320 may be used to store information obtained from respective external data sources as it may pertain to the individual fields in the fillable standard events form at a particular time. The storage of such data may streamline the evolution of obtaining the information appropriate to populating substantially all of the fillable fields in an automated fillable standard events form. Completed form information associated with one or more events or assets may be stored for immediate processing and/or for later analysis, review, and other beneficial purposes in order to provide, for example, periodic feedback to an air carrier or other aircraft control or operating entity regarding the substantial elimination of error rates in completion of standard events forms, recurring discrepancies and/or deviations fleet wide.

The data storage device(s) 320 may include a random access memory (RAM) or another type of dynamic storage device that is capable of storing updatable database information, and for separately storing instructions for execution of system operations by, for example, processor(s) 315. Data storage device(s) 320 may also include a read-only memory (ROM), which may include a conventional ROM device or another type of static storage device that stores static information and instructions for processor(s) 315. Further, the data storage device(s) 320 may be integral to the exemplary system 300, or may be provided external to, and in wired or wireless communication with, the exemplary system 300, including as cloud-based storage and/or processing elements.

The exemplary system 300 may include at least one data output/display device 325, which may be configured as one or more conventional mechanisms that output information to a user, including, but not limited to, a display screen on a GUI associated with the exemplary system 300 to provide feedback to an operator of the exemplary system 300 regarding, for example, system health.

The exemplary system 300 may include at least one external data source communication interface 330. Each interface 330 may be particularly configured to coordinate communications between the exemplary system 300 and each of the available data sources that may be referenced for compiling data from, for example, available data sources for a particular aircraft, event or other asset. Individual interfaces 330 may communicate with data sources and databases for collecting aircraft information in order to provide inputs that may allow the exemplary system 300 to parse, tag, format, display and integrate all available information appropriate to filling select fields in an auto-completion scheme for automated standard events forms. The disclosed standard events form auto-completion schemes may be implemented by the exemplary system 300 assimilating all available data source information from the multiple data sources to have the data available in a real-time or near-real-time scenario for auto completion of standard events forms.

The exemplary system 300 may include at least one form identification device 435. The form identification device 435 may reference a series of user-selectable standard events forms in order to determine which of the standard events forms a user has selected, and therefore which fields within the selected standard events form may require data to be automatically added.

The exemplary system 300 may include a database search device 340. Once the selected standard events form is identified, and the particular fields within that form are further identified, the database search device 340 may be used to specifically search information available from the connected data sources and/or databases to obtain information to satisfy each one of the fillable fields within the selected standard events form.

The exemplary system 300 may include a data parsing and formatting device 345. The data parsing and formatting device 345 may be usable to extract the particular pieces of information from the database information available from the multiple data sources and to translate the particular pieces of information from the various databases and/or data sources into a common format in order to facilitate the auto-fill function executed by the exemplary system 300.

The exemplary system 300 may include a form auto-fill device 350. The form auto-fill device 350 may be usable to properly insert the parsed and formatted data into the standard events form. The form auto-fill device 350 may also be usable to extract, from available information, one or more addresses for recipients of the standard events form, which the form auto-fill device may automatically fill into some manner of form recipient field including a "To" field in a particular form.

The exemplary system 300 may include a form dispatching device 355 that, upon completion of the standard events form, upon approval of the form by a user, upon revision of any of the information in the form by a user, or upon receipt of a manual "send" or like input by the user, may dispatch the standard events form to the indicated recipients.

At least the form identification device 335, the database search device 340, the data parsing and formatting device 345, and the form auto-fill device 350 may work in concert with one another to identify, collect, parse, tag, translate, and insert responsive data with respect to one or more auto-complete standard event forms. Each of these devices may be a standalone device within the exemplary system 300, or may operate as a function of one or more processors 315 in communication with one or more data storage devices 320 within, or associated with, the exemplary system 300.

All of the various components of the exemplary system 300, as depicted in FIG. 3, may be connected internally, and potentially to remote data storage and processing facilities or components, by one or more data communication and/or control busses 360. These data communication and/or control busses 360 may provide wired or wireless communication between the various components of the exemplary system 300, whether all of those components are housed integrally in, or are otherwise external and connected to, other components of an overarching aircraft communication and control system for carrying into the standard form auto complete schemes.

It should be appreciated that, although depicted in FIG. 3 as an essentially integral unit, the various disclosed elements of the exemplary system 300 may be arranged in any combination of sub-systems as individual components or combinations of components, integral to a single unit, or external to, and in wired or wireless communication with, the single unit of the exemplary system 300. In other words, no specific configuration as an integral unit or as a support unit is to be implied by the depiction in FIG. 3. Further, although depicted as individual devices/units for ease of understanding of the details provided in this disclosure regarding the exemplary system 300, it should be understood that the described functions of any of the individually-depicted components may be undertaken by one or more processors 315 connected to, and in communication with, one or more data storage device(s) 320, all of which may support implementation of the disclosed standard events form auto completion schemes.

Figure 4:
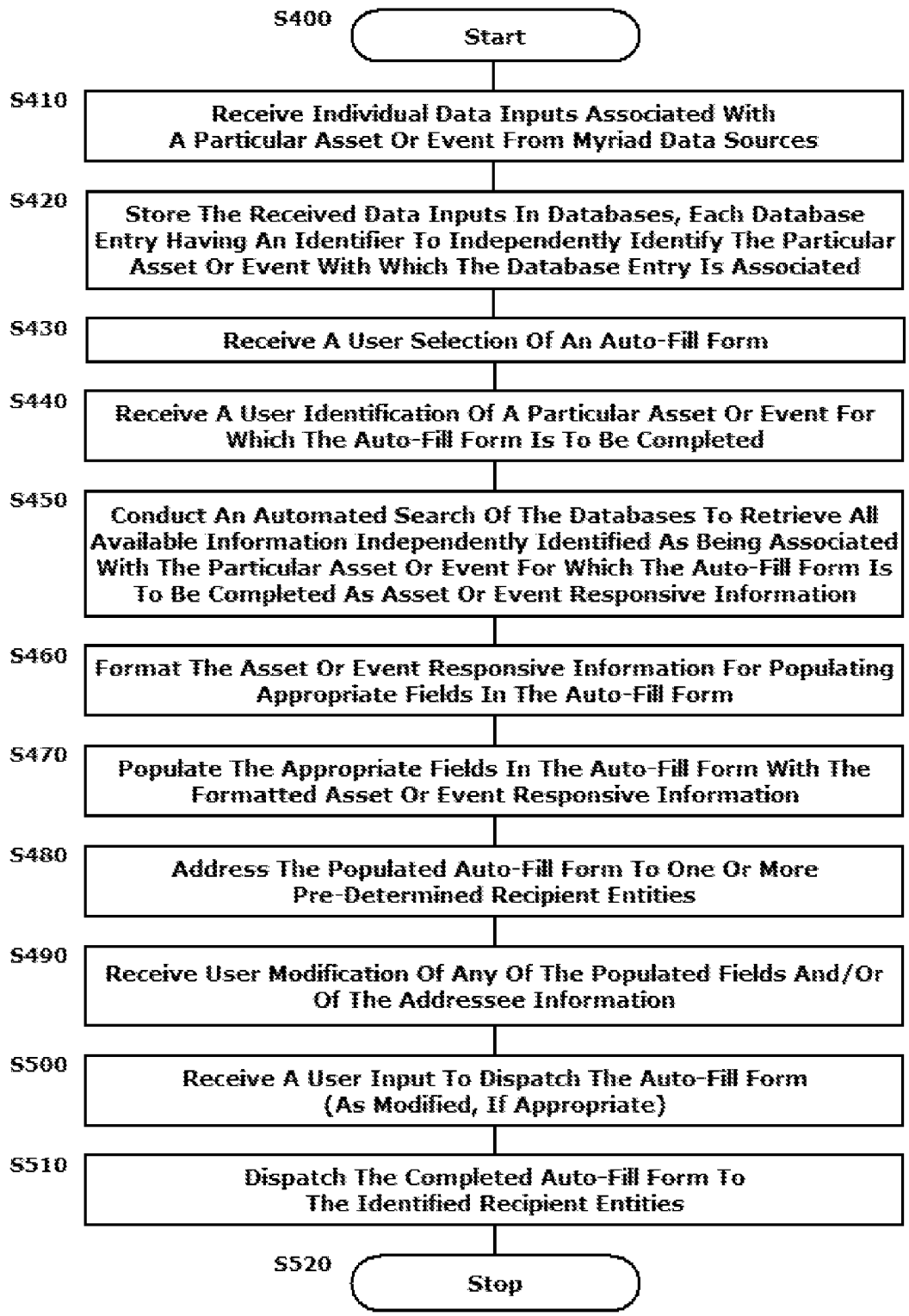
FIG. 4 illustrates a flowchart of an exemplary method for implementing a scheme for auto-completion of standard events forms according to the inventive concepts disclosed herein.

The disclosed embodiments may include an exemplary method for implementing a scheme for auto-completion of standard events forms. FIG. 4 illustrates an exemplary flowchart of such a method. As shown in FIG. 4, operation of the method commences at Step S400 and proceeds to Step S410.

In Step S410, individual data inputs associated with a particular asset or event may be received from one or more data sources. Operation of the method proceeds to Step S420.

In Step S420, the received data inputs may be stored in databases. Each database entry may have an identifier to independently identify the particular asset or event with which the database entries are associated. Operation of the method proceeds to Step S430.

In Step S430, a user selection of an auto-fillable standard events form may be received. Operation of the method proceeds to Step S440.

In Step S440, a user identification of a particular asset or event for which the auto-fillable standard events form is to be completed may be received. Operation of the method proceeds to Step S450.

In Step S450, an automated search of the databases may be conducted to retrieve all available information independently identified as being associated with the particular asset or event for which the auto-fillable standard events form is to be completed. The identified information may be collected as asset or event responsive information. Operation of the method proceeds to Step S460.

In Step S460, the asset or event responsive information may be properly formatted for populating appropriate fields in the auto-fillable standard events form. An advantage of the disclosed schemes is that the information received, and as stored in any cooperating database, may be in any format. It is the disclosed schemes that may convert the information into a compatible format for insertion into the auto-fillable standard events form. Operation of the method proceeds to Step S470.

In Step S470, the appropriate fields in the auto-fillable standard events form may be populated with the formatted asset or event responsive information. Operation of the method proceeds to Step S480.

In Step S480, the populated auto-fillable standard events form may be addressed to one or more pre-determined recipient entities. These recipient entities may be standard to the selection of the particular auto-fillable standard events form, or may be standard to the selection of the particular asset or event with which the information presented in the form is to be associated. Operation of the method proceeds to Step S490.

In Step S490, user inputs may be received to modify any of the data in any of the populated fields and/or to modify any one or more of the addressees for the now-completed auto-fillable standard events form. Operation of the method proceeds to Step S500.

In Step S500, a user input may be received to dispatch the now-completed auto-fillable standard events form. The user input may come in the form of an approval of the information provided in the now-completed auto-fillable standard events form (modified as appropriate), or may come in the form of an actual "send" command executed by the user. In embodiments, the user may be provided with, for example, a countdown timer that provides the user an opportunity to approve and/or further modify the form prior to the expiration of a set time period at which point the now-completed auto-fillable standard events form may be dispatched from the system. Operation of the method proceeds to Step S510.

In Step S510, the now-completed auto-fillable standard events form may be dispatched to the identified recipient entities. Operation the method proceeds to Step S520, where operation of the method ceases.

The disclosed embodiments may include a non-transitory computer-readable medium storing instructions which, when executed by a processor, may cause the processor to execute all, or at least some, of the functions that may be appropriate to implementing the steps of the method outlined above.

The above-described exemplary systems and methods reference certain conventional communicating and/or computing components to provide a brief, general description of suitable operating environments in which the subject matter of this disclosure may be implemented for familiarity and ease of understanding. Although not required, embodiments of the disclosed systems, and implementations of the disclosed methods, may be provided and executed, at least in part, in a form of hardware circuits, firmware, or software computer-executable instructions, including cloud-based applications, to carry out the specific functions described. These may include individual program modules executed by one or more processors. Generally, program modules include routine programs, objects, components, data structures, and the like that perform particular tasks or implement particular data types in support of the overall objective of the systems and methods implementing the inventive concepts disclosed herein.

Those skilled in the art will appreciate that other embodiments of the disclosed subject matter may be practiced in integrating all source data/information to derive individual data entries to be included in an implemented auto-complete scheme for standard format forms according to the above discussion.

The exemplary depicted sequence of executable instructions or associated data structures represent one example of a corresponding sequence of acts for implementing the functions described in the steps of the above-outlined exemplary method. The exemplary depicted steps may be executed in any reasonable order to carry into effect the objectives of the disclosed embodiments. No particular order to the disclosed steps of the method is necessarily implied by the depiction in FIG. 4, except where execution of a particular method step is a necessary precondition to execution of any other method step.

Although the above description may contain specific details, they should not be construed as limiting the claims in any way. Other configurations of the described embodiments of the disclosed systems and methods are part of the scope of this disclosure. It will be appreciated that various of the above-disclosed and other features and functions, or alternatives thereof, may be desirably combined into many other different systems or applications. Although the above description may contain specific details, they should not be construed as limiting the claims in any way. Other configurations are part of the scope of the disclosed embodiments. For example, the principles of the disclosed embodiments may be applied to each individual auto-complete task undertaken with respect to a particular standard events form that may individually reliably employ components of the disclosed system, or carry out functions of the disclosed schemes. This enables each access unit and/or electronic device to enjoy the benefits of the disclosed embodiments even if any one of the large number of possible end-user nodes (including individual aircraft) do not need some portion of the described functionality. In other words, there may be multiple instances of the disclosed system each processing the content in various possible ways. It does not necessarily need to be one system used by all end-user nodes. Accordingly, the appended claims and their legal equivalents should only define the disclosed embodiments, rather than any specific examples given.

I claim:

1. A system for form auto-completion, comprising:
    a data collection device that is configured to collect dynamically changing data from a plurality of data sources, the data relating to operation of a plurality of tracked events or a plurality of tracked assets, the plurality of data sources including a departure control system, an aircraft communications addressing and reporting system (ACARS), and an enterprise hub service;
    a display device for that is configured to display a plurality of automated form templates;
    a graphical user interface that is configured to
        accept a first user input selecting one of the plurality of automated form templates, the selected one of the plurality of automated form templates including standard data fields and auto-completed data fields, wherein a portion of the data fields are related to ground operations for an aircraft flight, and
        accept a second user input selecting of identification information for at least one of a tracked event and a tracked asset, the at least one of a tracked event and the tracked asset being the aircraft flight;
    a data integration device that is configured to recognize the selected one of the plurality of automated form templates, identify data fields in the selected one of the plurality of automated form templates, the identified data fields being populated with information regarding at least one of passenger loading, baggage loading, cargo loading and fuel loading for the aircraft flight,
        search and regex parse the collected data from the plurality of data sources using the identification information to obtain data elements to be included in the identified data fields in the selected one of the plurality of auto form templates, and
        populate the identified data fields in the selected one of the plurality of automated form templates with the obtained and regex parsed data elements to form a completed automated form, the data integration device being further configured to format the obtained and regex parsed data elements for inclusion in the identified data fields via an auto-completed data entry;
    update the identified data fields which were filled via an auto-completed data entry with updated data when the data changes; and
    automatically generate at least one recipient of the completed automated form based on a type of the completed automated form and further based on the aircraft flight.

2. The system of claim 1, the data integration device being further configured to identify recipients for the completed automated form;
    populate a recipient data field in the completed automated form with address information for the identified recipients; and
    dispatch the completed automated form to the identified recipients.

3. The system of claim 2, the user interface being further configured to accept user input directing dispatch of the completed automated form to the identified recipients.

4. The system of claim 1, the user interface being further configured to accept user inputs that modify one or more of the data elements.

5. The system of claim 1, further comprising a data storage device, the data storage device being further configured to store the collected data in one or more databases, each stored data element being associated with a flight number of the aircraft flight.

6. The system of claim 1, further comprising a data storage device, the data integration device being further configured to store each completed automated form in the data storage device.

7. A method for form auto-completion, comprising:
    accessing, by at least one processor executing processor-executable code stored in a non-transitory processor-readable medium, data from a plurality of data sources, the data relating to operation of at least one of a plurality of tracked events and a plurality of tracked assets, the plurality of data sources including a departure control system, an aircraft communications addressing and reporting system (ACARS), and an enterprise hub service;
    accepting, by the at least one processor, a first user input selecting one of the plurality of automated form templates, the selected one of the plurality of automated form templates including a graphical user interface that includes standard data fields and auto-completed data fields, wherein a portion of the data fields are related to ground operations for an aircraft flight;
    accepting, by the at least one processor, a second user input selecting identification information for at least one of a tracked event and a tracked asset, the at least one of a tracked event and the tracked asset being the aircraft flight identified by a flight number;
    recognizing, by the at least one processor, the selected one of the plurality of automated form templates;
    identifying, by the at least one processor, data fields in the selected one of the plurality of automated form templates;
    searching, by the at least one processor, the collected data from the plurality of data sources using the identification information to obtain data elements to be included in the identified data fields in the selected one of the plurality of auto form templates, the identified data fields being populated with information regarding at least one of passenger loading, baggage loading, cargo loading and fuel loading for the aircraft flight known by the flight number;

populating, by the at least one processor, the identified data fields in the selected one of the plurality of automated form templates with the obtained data elements to form a completed automated form, wherein the obtained data elements have been regex parsed and formatted for inclusion in the identified data fields;

updating the identified data fields with updated data when the data changes; and automatically forwarding the completed automated form to one or more recipients, the one or more recipients being automatically determined based on a type of the completed automated form and further based on the aircraft flight.

8. The method of claim 7, further comprising:
identifying, by the at least one processor, recipients for the completed automated form;
populating, by the at least one processor, a recipient data field in the completed automated form with address information for the identified recipients; and
dispatching, by the at least one processor, the completed automated form to the identified recipients.

9. The method of claim 8, further comprising accepting, by the at least one processor, a third user input directing dispatch of the completed automated form to the identified recipients.

10. The method of claim 7, further comprising accepting, by the at least one processor, a fourth user input modifying one or more of the obtained data elements.

11. The method of claim 7, further comprising storing the collected data in one or more databases, each stored data element being associated with a particular flight number.

* * * * *